UNITED STATES PATENT OFFICE 2,068,319

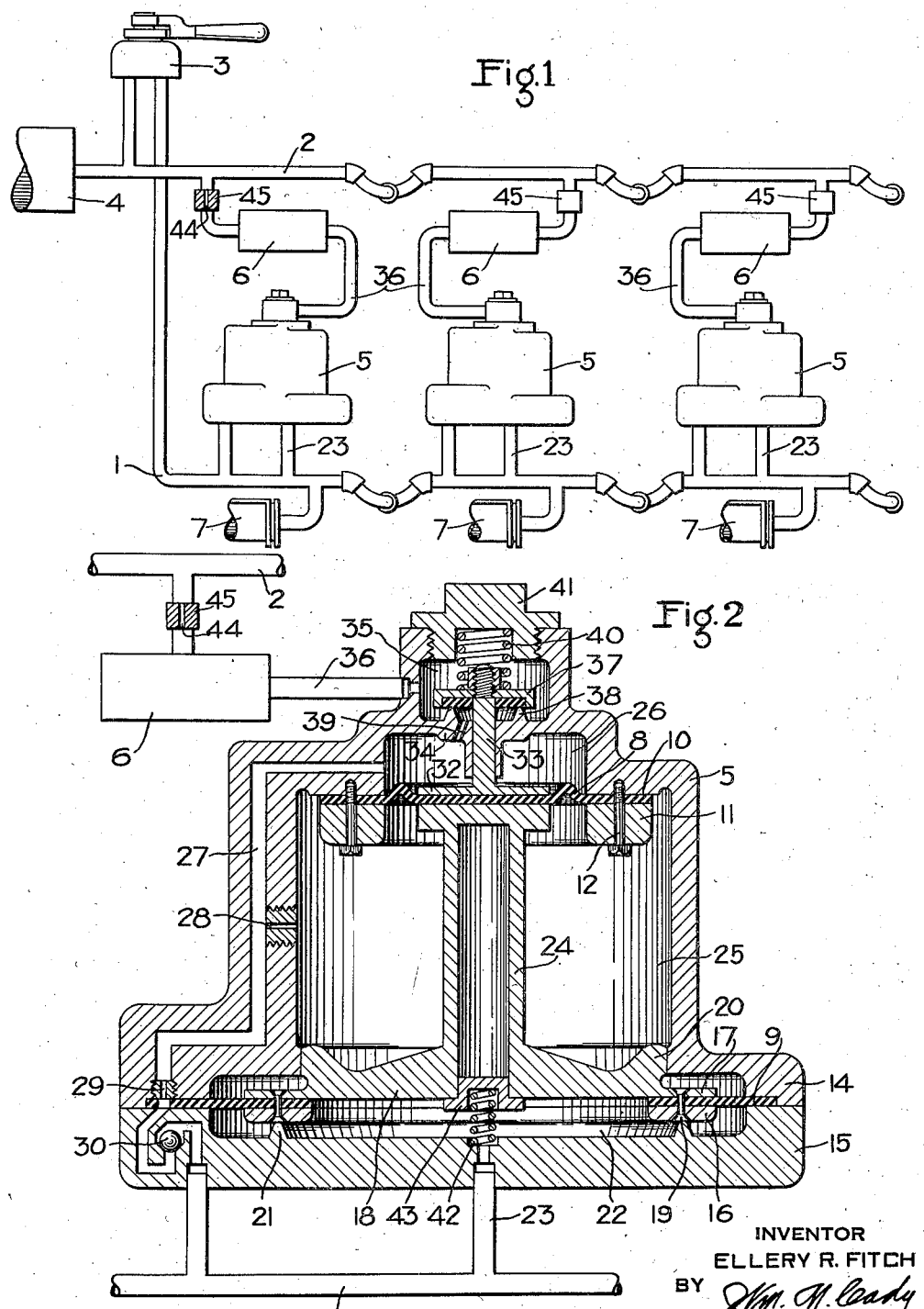

BRAKE CONTROL

Ellery R. Fitch, Irwin, Pa., assignor to The Westinghouse Air Brake Company, Wilmerding, Pa., a corporation of Pennsylvania Application November 27, 1935, Serial No. 51,780

13 Claims. (Cl. 303—48)

This invention relates to fluid pressure brakes, and more particularly to a fluid pressure brake system of the type employing straight air for brake control.

In controlling the brakes in a system in which an application is effected by supplying fluid under pressure to the straight air pipe, it is apt to be difficult to build up the desired fluid pressure in said pipe rapidly and uniformly, due in part to the large volume of fluid under pressure to be handled and resistance to flow set up by friction throughout the pipe.

The principal object of my invention is to provide means on each car of a train equipped with a straight air brake, operative in response to the pressure of fluid initially supplied to the straight air pipe for supplying fluid under pressure locally to said straight air pipe, thereby accelerating transmission of the pressure wave throughout the train and effecting a rapid and substantially uniform build-up in the pressure of fluid in said pipe.

Another object of my invention is to provide an accelerator valve device responsive to a light increase in fluid pressure in the straight air pipe of a brake system of the above type, for supplying a limited amount of fluid under pressure to said pipe.

In the accompanying drawing, Fig. 1 is a diagrammatic view of a fluid pressure brake equipment for a train of cars showing my improved straight air brake equipment applied to each car, and Fig. 2 is an enlarged diagrammatic view, mainly in section, of the brake apparatus employed on each car.

As shown in the drawing, the straight air brake equipment comprises a straight air pipe 1, a supply pipe 2 extending through the train, a brake valve device 3 and main reservoir 4 on the power vehicle, and an application accelerator valve device 5, a supply reservoir 6 and a brake cylinder 7 on each vehicle in the train. The brake valve 3 may be of any suitable type manually movable to an application position in which fluid under pressure is supplied from the main reservoir 4 to the straight air pipe 1, and movable to a release position in which fluid under pressure is vented from said straight air pipe to the atmosphere.

The accelerator valve device 5 comprises a casing containing a pair of spaced diaphragms 8 and 9 having differential areas, the diaphragm 8 being secured at its periphery between a clamping face 10 provided within the casing and a ring 11, which is clamped to said face by means of bolts 12, and the diaphragm 9 having its outer edge clamped by suitable means (not shown) between an outwardly extending flange 14 of the casing and a cover plate 15, which is provided for closing the lower end of said casing.

The diaphragm 9 has a central opening, and the inner periphery of the diaphragm is clamped between a ring 16 and the peripheral flange portion 17 of a movable follower member 18, said members being secured together by suitable means such as rivets 19. Radially disposed on the follower member 18 are guide ribs 20, the outer ends of which engage a bore in the casing and serve to guide said follower member as it is moved back and forth relative to the casing. An annular stop 21 is provided on the cover plate 15 and is adapted to engage the ring 16 for limiting downward movement of the follower member 18 and the diaphragm 9. A chamber 22 formed between the diaphragm 9 and follower member 18 and the cover plate 15 is connected through a pipe 23 with the straight air pipe 1.

Centrally disposed on the follower member 18 is a hollow stem portion 24, which extends through a chamber 25 formed between the diaphragms 8 and 9 and operatively engages the smaller diaphragm 8, thereby connecting said diaphragm with the diaphragm 9 so that both diaphragms move simultaneously.

At the upper side of the diaphragm 8 is formed a chamber 26, which is connected to a passage 27 leading to the straight air pipe 1. A restricted passage 28 connects passage 27 with the chamber 25, and a choke plug having a restricted port 29 and a ball check valve 30 are interposed in said passage 27, said check valve being adapted to prevent back flow of fluid under pressure from said pipe.

Contained in the chamber 26 and engaging the diaphragm 10 is a plunger 32, which has a stem 33 slidably mounted in a suitable bore in a partition wall 34 separating said chamber from a valve chamber 35, the valve chamber 35 being connected through a pipe 36 with the supply reservoir 6. The stem 33 carries a valve 37, which is adapted to engage a seat rib 38 formed on the wall 34 for controlling communication between the chambers 35 and 26 by way of a passage 39. A spring 40 is provided for urging the valve 37 normally into engagement with seat rib 38, said spring being interposed between the valve and a cap nut 41 having screw-threaded engagement with the casing for closing the valve chamber 35. In order to counterbalance the dead weight of the movable elements associated with the diaphragms, and thus to render the accelerator valve device more sensitive, a light spring 42 is interposed between the cover plate 16 and a guide member 43 mounted in the follower 18.

In operation, fluid under pressure supplied to the main reservoir 4 in the usual manner flows through the supply pipe 2 and thence through a branch pipe to the supply reservoir 6 provided on each car of the train, the branch pipe having a choke plug 45 therein, which is provided with a restricted flow port 44. The supply reservoirs throughout the train are thereby charged with fluid at main reservoir pressure. With the brake valve device 3 in the release position, the straight air pipe 1, and consequently the connected brake cylinders 7, are open to the atmosphere by way of the usual exhaust port in the brake valve device.

If it is desired to effect an application of the brakes, the brake valve device 3 is moved to the service position, in which it is operative to supply fluid under pressure from the main reservoir 4 to the straight air pipe 1. Fluid under pressure thus supplied to the straight air pipe then flows through the pipe 23 to the chamber 22 of the accelerator valve device 5 of the first vehicle of the train, and acts on the diaphragm 9 and follower 18. When the pressure of fluid in the chamber 22 exceeds the opposing pressure of the valve spring 40, the diaphragm 9, follower 18, diaphragm 8, plunger 32 and valve 37 are shifted upwardly, as viewed in Fig. 2 of the drawing, so that the valve 37 is unseated and communication is established between the valve chamber 35 and the chamber 26. Fluid at main reservoir pressure then flows from the supply reservoir 6 through the pipe 36, chamber 35, passage 39, chamber 26, passage 27, restricted passage 29, and past the check valve 30 to the straight air pipe 1, thereby augmenting the pressure of fluid initially supplied to said pipe.

Upon the local increase in the fluid pressure in the straight air pipe 1, the pressure wave is quickly transmitted to the next car in the train, effecting similar operation of the accelerator valve device on that car to supply fluid under pressure locally to the straight air pipe in the same manner as on the first car of the train as just described. With this operation rapidly repeated serially by the operation of the successive accelerator valve devices throughout the train, a substantially uniform build-up of fluid pressure in said pipe and in the connected brake cylinders is effected.

At the same time, fluid under pressure flows from the passage 27 in the accelerator valve device 5 by way of the restricted passage 28 to the chamber 25, thus effecting a gradual build-up in fluid pressure in said chamber while fluid under pressure is being supplied to the straight air pipe as hereinbefore described. When the fluid pressure in chamber 25 has been increased sufficiently so that the fluid pressure acting on the differential area of diaphragm 9 plus the fluid pressure acting in chamber 26 on the diaphragm 8 and the pressure of spring 40 exceeds the fluid pressure acting on the opposing area of the diaphragm 9, the assembly will be shifted to the normal position, as shown in the drawing, permitting the spring 40 to move the valve 37 into engagement with the seat rib 38 for cutting off further local supply of fluid under pressure to the straight air pipe 1.

It will be understood that by proper proportioning of the relative flow areas of the restricted passages 28 and 29, the accelerator valve device may be adapted to operate so as to control the local supply of fluid under pressure as desired. Thus, if the brake valve device 3 is operated to supply a relatively small amount of fluid under pressure to the straight air pipe to effect a light application of the brakes, thereby creating a correspondingly light initial fluid pressure in the chamber 22 in each accelerator valve device, the flow of fluid under pressure through the restricted passage 28 to the chamber 25 will in a short interval cause the fluid pressure acting downwardly on the diaphragm 9, as aided by the fluid pressure in chamber 26 acting downwardly on diaphragm 8, to balance the opposing fluid pressure in said chamber 22, permitting the spring 40 to seat the valve 37 for quickly cutting off the local supply of fluid under pressure to the straight air pipe.

On the other hand, if the supply of fluid under pressure by way of the brake valve device 3 is continued, as in effecting a heavy application of the brakes, the fluid pressure in the chamber 22 of the accelerator valve device may for a time increase substantially as fast as that in the chamber 25, thus maintaining the valve 37 unseated for a longer interval.

It will be evident from the foregoing description that my invention comprises means operative in response to the fluid pressure initially supplied to the straight air pipe in effecting an application of the straight air brakes, to supply a predetermined amount of fluid under pressure locally to said straight air pipe, thereby effecting a rapid and substantially uniform increase in brake cylinder pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a straight air pipe adapted to be supplied with fluid under pressure for effecting an application of the brakes, a brake cylinder communicating with said pipe, a source of fluid under pressure, and a valve device operative in response to the pressure of fluid supplied to said straight air pipe to supply fluid under pressure from said source through said straight air pipe to the brake cylinder.

2. In a fluid pressure brake, in combination, a straight air pipe adapted to be supplied with fluid under pressure for effecting an application of the brakes, a local source of fluid pressure, and an accelerator valve device comprising a movable abutment subject to the opposing pressures of the straight air pipe and a chamber, and valve means operated by said abutment upon an increase in fluid pressure in said pipe for opening a communication through which fluid under pressure is supplied from said local supply to the straight air pipe, and means for charging said chamber with fluid under pressure supplied by said valve means at a restricted rate.

3. In a fluid pressure brake, in combination, a straight air pipe adapted to be supplied with fluid under pressure for effecting an application of the brakes, a local source of fluid pressure, and an accelerator valve device comprising a movable abutment subject to the opposing pressures of the straight air pipe and a chamber, and valve means operated by said abutment upon an increase in fluid pressure in said pipe for opening a communication through which fluid under pressure is supplied from said local supply to the straight air pipe, a check valve for preventing back flow from said straight air pipe through said communication, and means for charging said chamber with fluid under pressure supplied by said valve means.

4. In a fluid pressure brake system for a train, in combination, a straight air pipe adapted to be supplied with fluid under pressure for effecting an application of the brakes, a supply pipe charged with fluid under pressure, and an accelerator valve device on cars of the train, comprising a casing having a passageway through which fluid under pressure can flow from the supply pipe to the straight air pipe, valve means normally closing said passageway, and a movable abutment exposed on one side to the straight air pipe and on the opposite side to the fluid pressure in a chamber having restricted communication with said passageway, for operating said valve means.

5. In a fluid pressure brake system for a train, in combination, a supply pipe charged with fluid under pressure, a straight air pipe adapted to be supplied with fluid under pressure for effecting an application of the brakes, a brake cylinder on each car of the train communicating with said straight air pipe, and means operative in response to the pressure of fluid supplied to the straight air pipe to establish communication from said supply pipe to said straight air pipe and consequently to each brake cylinder.

6. In a fluid pressure brake system for a train, the combination with a straight air pipe and a brake valve device adapted to supply fluid under pressure to said straight air pipe for effecting an application of the brakes, of a supply pipe charged with fluid under pressure, and an accelerator valve device on each car of the train comprising a normally closed valve for controlling a communication through which fluid under pressure is adapted to flow from the supply pipe to the straight air pipe, a movable abutment subject on one side to the fluid pressure in the straight air pipe and subject on the opposite side to the pressure in a chamber and operative by fluid under pressure supplied to the straight air pipe by said brake valve device to open said valve, and a restricted passage for charging the chamber with fluid under pressure flowing from the supply pipe, whereby upon cutting off the supply of fluid under pressure from the brake valve device to the straight air pipe, the build up of fluid pressure in said chamber will operate said abutment to effect the closure of said valve.

7. In a fluid pressure brake, in combination, a straight air pipe, a brake cylinder connected to said pipe, a source of fluid under pressure, a valve for controlling the supply of fluid from said source to said straight air pipe, a pair of associated movable abutments having differential areas for operating said valve, the abutment having the larger area being subject on one side to the fluid pressure in the straight air pipe, and the chamber intermediate said abutments being subject to the pressure of fluid supplied by said valve to the straight air pipe.

8. In a fluid pressure brake, in combination, a straight air pipe, a brake cylinder connected to said pipe, a source of fluid under pressure, a valve for controlling the supply of fluid from said source to said straight air pipe, a pair of associated movable abutments having differential areas for operating said valve, the abutment having the larger area being subject on one side to the fluid pressure in the straight air pipe, fluid flowing past said valve to the straight air pipe being supplied through a restricted port to a chamber intermediate said abutments.

9. In a fluid pressure brake, in combination, a straight air pipe, a brake cylinder connected to said pipe, a source of fluid under pressure, a valve for controlling the supply of fluid from said source to said straight air pipe, a pair of associated movable abutments having differential areas for operating said valve, the abutment having the larger area being subject on one side to the fluid pressure in the straight air pipe, the abutment having the smaller area being subject on one side to the pressure of fluid supplied by said valve to the straight air pipe, and the chamber intermediate said abutments being supplied through a restricted passage with fluid flowing past said valve to the straight air pipe.

10. In a fluid pressure brake for a train, in combination, a straight air pipe, a brake valve device for supplying fluid under pressure to the straight air pipe, a brake cylinder on a vehicle of the train connected to said pipe, a local source of fluid under pressure, a valve for controlling the supply of fluid under pressure from said source to the straight air pipe, a pair of associated movable abutments having differential areas for operating said valve, the abutment having the larger area being subject on one side to the fluid pressure in the straight air pipe, and the chamber intermediate said abutments being subject to the pressure of fluid supplied by said valve to the straight air pipe.

11. In a fluid pressure brake, in combination, a straight air pipe, a brake cylinder connected to said pipe, a brake valve device for supplying fluid under pressure to the straight air pipe, a supply pipe charged with fluid under pressure, a local supply reservoir, a restricted passage through which fluid under pressure flows from said supply pipe to said reservoir, and a valve device operative in response to the pressure of fluid supplied to the straight air pipe to supply fluid under pressure from said reservoir to said straight air pipe.

12. In a fluid pressure brake, the combination with a straight air pipe and a brake valve device operative to supply fluid under pressure to said straight air pipe for effecting an application of the brakes, of a source of fluid under pressure, and an accelerator valve device operative by fluid under pressure supplied to the straight air pipe by said brake valve device to supply fluid under pressure from said source to the straight air pipe to a degree dependent upon the degree of fluid pressure in said pipe.

13. In a fluid pressure brake, in combination, a brake cylinder, a straight air pipe, a brake valve device adapted to supply fluid under pressure through said pipe to the brake cylinder for effecting an application of the brakes, a supplementary source of fluid under pressure, and valve means subject to the pressure of fluid in the straight air pipe and operative when fluid under pressure is supplied to said straight air pipe by said brake valve device to effect an additional flow of fluid under pressure from said source through said straight air pipe to the brake cylinder.

ELLERY R. FITCH.